Figure 1:
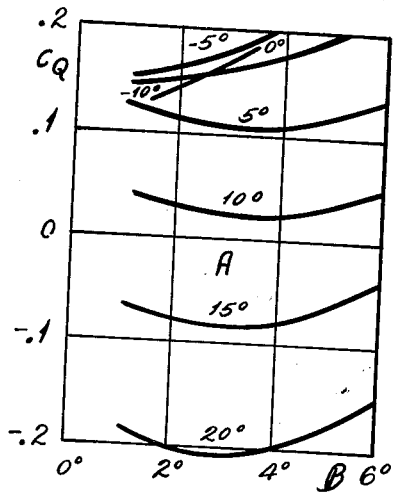

June 8, 1954

K. H. HOHENEMSER 2,680,579

ROTOR SPEED CONTROL FOR ROTOR-FIXED WING AIRCRAFT

Filed March 26, 1951

INVENTOR:
KURT H. HOHENEMSER
By Carr & Carr & Gravely
ATTORNEYS.

Patented June 8, 1954

2,680,579

UNITED STATES PATENT OFFICE 2,680,579

ROTOR SPEED CONTROL FOR ROTOR-FIXED WING AIRCRAFT

Kurt H. Hohenemser, Rock Hill, Mo., assignor to McDonnell Aircraft Corporation, St. Louis, Mo., a corporation of Maryland Application March 26, 1951, Serial No. 217,572

4 Claims. (Cl. 244—17.13)

This invention relates to rotor speed control means for substantially autorotating rotors for aircraft, and is of particular value in aircraft of the type utilizing a substantially autorotating lifting rotor along with a small fixed wing for flight conditions of large rotor advance ratio when all or most of the driving torque for the rotor is provided by the relative airflow over the aircraft.

In such rotor-fixed wing aircraft, while wing lift is gradually built up and the rotor lift reduced with increasing flight speed, the rotor speed must nevertheless be kept within certain limits. A sudden loss of rotor speed at a high flight speed resulting from increased flight speed, maneuvering, or encountering gusts, is likely to cause a failure of the rotor blades and a loss of the aircraft. Hence, there must be no uncontrollable deceleration of the substantially autorotating rotor. It has been found that the rotor speed in a rotor-fixed wing aircraft in the conditions of autorotation or close to autorotation is highly sensitive to changes in forward flight speed, and the speed of rotation is likely to decrease dangerously with increased forward speed. This undesirable characteristic is one of the main reasons why relatively little has been done in recent years to advance the development of this type of aircraft.

The principal object of the present invention is to provide automatic speed control for substantially autorotating lifting rotors which will be effective under high rotor advance ratios and under all such gust and maneuvering conditions as are ordinarily encountered.

Another object of the invention is to provide means, to be utilized at low forward speeds, for eliminating the automatic speed response of the rotor.

The invention consists in the provision of means for governing the speed of an autorotating rotor by adjusting the longitudinal tilt of the effective plane of the rotor with respect to the relative wind responsive to changes in rotor speed.

The invention also consists in the provision of a substantially autorotating rotor, the cyclic pitch control thereof being so coupled with the shaft of the rotor as to increase the effective angle of the rotor control plane with the relative wind upon decrease of speed of the rotor shaft and vice versa.

The invention further consists in the provision of speed control means for a substantially autorotating rotor wherein the angle of the effective rotor control plane with the relative wind may be varied in response to the relative speed of the rotor shaft and the forward speed of the aircraft, including means for permitting the pilot to control the rotor.

With the above and other objects in view, this invention resides in the novel features of form, construction, arrangement, and combination of parts presently described and pointed out in the claims.

Figure 2:
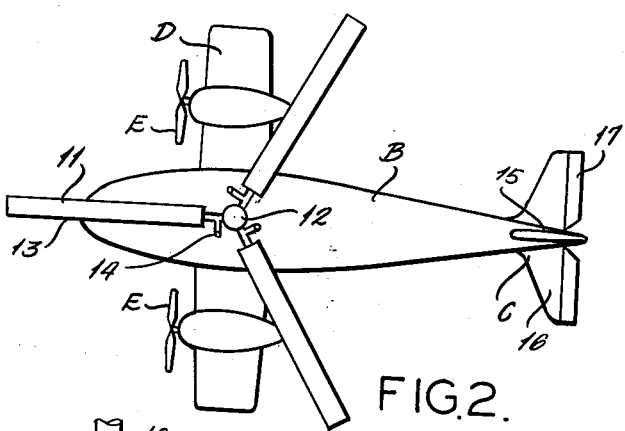
Figure 3:
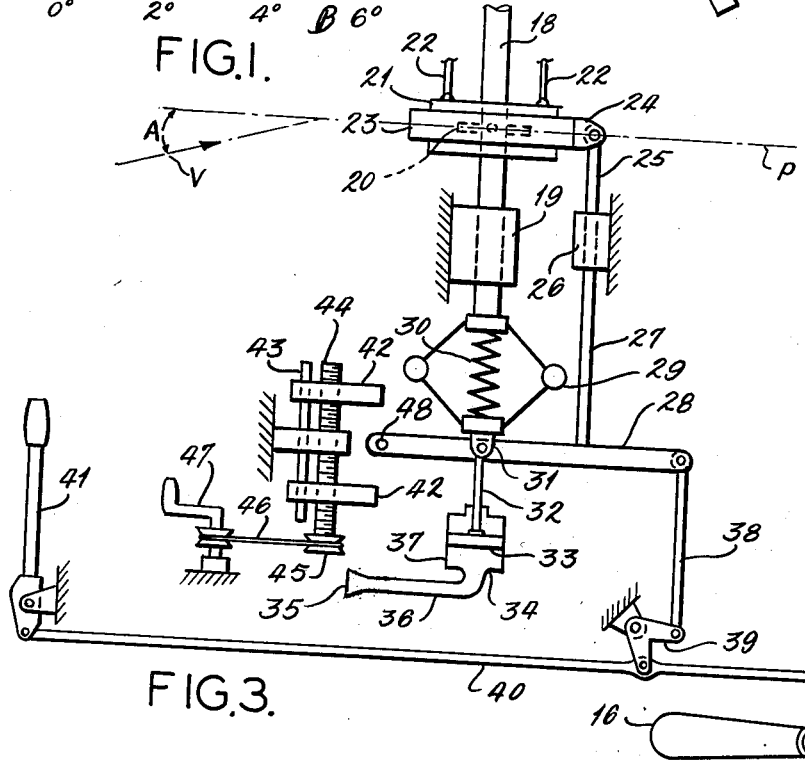

In the accompanying drawings:

Fig. 1 is a graph showing the effect on rotor torque of changing the collective blade pitch angle as compared with tilting the effective plane of the rotor, Fig. 2 is a schematic plan view of a rotor-fixed wing aircraft of the type referred to herein; and Fig. 3 is a schematic elevational layout of a rotor speed control system embodying and exemplifying the present invention.

Referring now by reference characters to the drawings, which illustrate a preferred embodiment of the invention, in Fig. 1 the coefficient of rotor torque $C_Q$ is plotted against the blade pitch angle B for various angles A of the swashplate with the relative wind. A constant advance ratio of 0.2 is assumed.

In Fig. 1, positive values of $C_Q$ indicate a decelerating rotor torque, while negative $C_Q$ values indicate an accelerating rotor torque. From this figure it is apparent that, in respect to accelerating or decelerating the rotor, the tilting of the swashplate (changing the angle A) has a powerful and reliable effect. With regard to change of rotor blade angle B, it is to be noted that the effect of such change is neither powerful nor consistent. Between pitch angles of zero degrees and about three degrees, an increase in angle accelerates the rotor, but from approximately three degrees upward, a further increase in pitch angle decelerates the rotor.

In the high speed flight range of such a rotor-fixed wing aircraft, gusts and maneuvers will cause changes in angle of attack of the order of magnitude of ten degrees. Referring to Fig. 1, it is apparent that the effect of such large changes in angle of attack on the torque of a substantially autorotating rotor could never be compensated by changing the blade pitch angle B. It is, therefore, concluded that the problem of controlling the speed of a substantially autorotating rotor cannot be satisfactorily solved by the use of mechanism for changing the collective blade pitch.

Fig. 1 illustrates that adjustment of the swashplate with respect to the relative wind (that is, control of the angle A) will permit control of the rotor acceleration and deceleration regardless of the flight speed and throughout the range of angles of attack resulting from maneuvers and gusts.

Fig. 2 shows in plan view a simple rotor-fixed wing aircraft having a conventional fuselage B, empennage C, and a relatively small, fixed wing D supporting conventional engines for driving the propellers E at each side of the plane of symmetry of the aircraft. In addition, the aircraft is equipped with a lifting rotor 11 having a hub 12 in which are journal-mounted the rotor blades 13, each incorporating near its root adjacent the rotor hub 12 a pitch change horn 14.

The aircraft empennage C comprises a vertical or yaw-control surface 15, a horizontal stabilizer 16, and a controllable elevator surface 17, which may be equipped with fixed or controllable tabs, not here shown.

Referring now to Fig. 3, the system herein provided for controlling the speed of the rotor 11 comprises a rotor shaft 18 supported for rotation in a lift bearing 19 secured to the structure of the aircraft. The upper extremity of the rotor shaft 18 terminates in the rotor hub 12, shown in Fig. 2. Mounted on the rotor shaft between the hub 12 and the lift bearing 19, by means of a rotor longitudinal attitude adjusting means including a gimbel mounting or universal hinge 20, is a rotating inner swash plate 21 which is caused to rotate with the rotor 11 by the several links 22 connecting said swash plate 21 to the pitch-changing horns 14 of the respective blades 13. In Fig. 3, the plane of the swashplate 21 as represented by the reference line P and A is the angle between the plane P and the direction of relative flow V.

In mating bearing relationship with said rotating inner swash plate 21 is another part of the attitude adjusting means represented by a non-rotating outer race 23 having an aft-extending lug 24 pin-connected to the actuator push-pull rod 25 of an actuator 26 secured to the structure of the aircraft. The actuator 26, shown schematically in Fig. 3, may be of any type, either mechanical, hydraulic or electric, adapted to transmit input motion from a control member, such as the control link 27 here shown, to a linear actuator rod, such as the push-pull rod 25, while causing all external forces acting on such actuator rod to be absorbed in the structure of the aircraft. Such mechanical, hydraulic and electrical actuators are well-known in the art.

The control link 27, which transmits input motion to the actuator 26, is operatively pin-connected to a walking beam 28 which exerts on said control link 27 the control forces hereinafter described. The walking beam 28 constitutes a differential mechanism for transmitting control effect from a plurality of inputs to one output connected to the adjusting means 21.

Secured to the lower end of the rotor shaft 18 is a speed governor which may be a rotating flyball governor 29 having a spring 30 whose force is adapted to resist the centrifugal force built up in the governor attendant rotation of the rotor shaft. Secured to the lower end of the governor 29 is a lug 31 pin-connected to said walking beam. Pinned to said walking beam 28 at the same point (or any other convenient point suitable for the transmission of its force) is the rod 32 of the piston 33 of a dynamic pressure pick-up 34 which operates responsive to the ram or stagnation pressure of the air stream communicated from the exterior of the aircraft by means of an external, forwardly extending pressure pick-up inlet 35 and transmitted through a pressure tube 36 into cylinder 37 of the pressure pick-up 34.

On walking beam or differential mechanism 28 at the side of the output link 27 opposite the point of connection of the governor lug 31 is operatively connected an input control push-rod 38 acting through a bellcrank 39 to form a part of the longitudinal control system 40 of the aircraft. It is evident from Fig. 3 that in the operation of said longitudinal control system, the exertion of a backward force on the control stick 41, transmitted through said longitudinal control system 40 to raise the elevator 17 (which will normally cause the aircraft to nose upwardly) will tend to lower the control link 27 and produce a corresponding movement of the actuator push-pull rod 25. This will tilt the rotating swash plate 21 backward and effect a cyclic pitch change of the rotor blades 13 equivalent to tilting the plane of rotation of the rotor backward.

In flight, the automatic elements of the controls, being the governor 29 and the dynamic pressure pick-up 34, functions as follows: If the autorotating rotor is caused to decelerate, whether by increase in forward speed or other factors, such deceleration will reduce the centrifugal force of the governor 29, causing the governor lug 31 to exert a downward force on the walking beam 28 and hence a backward tilting of the rotor control plane, that is, an increase in the angle A. The rotor torque coefficient $C_Q$ will thus be augmented and the rotor speed restored. An undue increase in rotor speed will result in the governor 29 raising the walking beam 28 and lessening the angle A. With increased forward speed the ram pressure in the inlet 35 of the dynamic pressure pick-up 34 increases so as to force the piston 33 upwardly. This serves to offset the compressed force of the spring 30 of the governor 29, and there will be a consequent lessening of the angle A. The consequent lessening of the rotor lift at high forward speeds is appropriate because of the increased lift of the fixed wing.

While the governor 29 and the dynamic pressure pick-up 34 serve valuable functions at high forward speeds, it is deemed preferable that they be relieved of their functions under conditions of low speed flight. Adjacent the end of the walking beam 28 opposite the control push-rod 38, there is provided a pair of stop plates 42 drilled and mounted for sliding motion along guide rod 43. Said plates 42 are also tapped in opposite senses to receive a threaded spindle 44 whose threads run right-handed with respect to one of said stop plates 42 and left-handed with respect to the other thereof. Secured concentrically to one end of said spindle 44 is a drum 45 adapted to transmit to said spindle 44 the movement of a cable 46 actuated from the cabin of the aircraft by means of a cranking drum 47. The walking bear 28 is equipped at its end adjacent said stop plates 42, with a bearing 48. Turning the cranking drum 47 will cause the stop plates 42 to approach and abut said bearings 48 so that there can be no movement of the walking beam transmitted to the control link 27 independently of motion of the control stick 41. In this manner the pilot is enabled to control the attitude of the aircraft at low speeds in a manner similar to the control of conventional helicopters.

In the range of high forward flight speeds, the stop plates 42 are moved apart so as to permit the governor 29 and associated controls to function even though the control stick 41 be held fixed.

From a consideration of the linkage to the walking beam 28, illustrated in Fig. 3, it is apparent that in flight with the stop plates 42 withdrawn, the position of the control link 27 is a function both of the position of the control stick 41 and of the governor 29, said governor operating subject to the pressure of the dynamic pressure pick-up 34. Should the pilot, by movement of the control stick 41, cause a movement of the control link 27, the changed rotor speed resulting from change in angle caused thereby, would so act on the governor 29 as to result in substantial restoration of the original position of said control link 27. Consequently, the governor 29 tends to keep the rotor speed at a desired value independent of the position of the control stick 41. The relative effects of the stick position and governor position on the movement of the control link 27 may be modified as desired by moving the points of connection to the walking beam 28. Further, usual types of control may be employed for the governor 29 and its spring 30 to meet the characteristics of the particular aircraft upon which the rotor speed control system is employed.

The present invention has application not merely to rotor-fixed wing aircraft but to autogyros and other forms of aircraft wherein substantially autorotating rotors may be employed. However, its advantages are most marked when employed in connection with aircraft designed to operate at high forward speeds, freeing such aircraft from the hazard of rotor deceleration at high speeds under the accelerations and disturbances of air flow likely to be encountered.

It should be understood that changes and modifications in the form, construction, arrangement and combination of the several parts of the speed control for rotor-fixed wing aircraft may be made and submitted for those herein shown and described without departing from the nature and principle of the present invention.

What I claim is:

1. An aircraft comprising a fuselage, a lifting rotor connected to said fuselage, said rotor being adjustable to vary the longitudinal attitude of the rotor plane with respect to the fuselage, a shaft connected to said rotor, rotor longitudinal attitude adjusting means connected to said rotor, actuating means for said rotor longitudinal attitude adjusting means connected to and responsive to the speed of rotation of said shaft, whereby a decrease in shaft speed will produce a decrease in forward inclination of the rotor plane, and whereby an increase in shaft speed will produce an increase in forward inclination of the rotor plane.

2. An aircraft comprising a fuselage, a lifting rotor connected to said fuselage, said rotor being adjustable to vary the longitudinal attitude of the rotor plane with respect to the fuselage, a shaft connected to said rotor, rotor longitudinal attitude adjusting means connected to said rotor, first actuating means for said rotor longitudinal attitude adjusting means connected to and responsive to the speed of rotation of said shaft, second actuating means for said rotor longitudinal attitude adjusting means comprising a ram pressure device arranged to be responsive to the forward speed of the aircraft, whereby when the forward speed of the aircraft is held fixed a decrease of the shaft speed will produce a decrease in forward inclination of the rotor plane, and whereby an increase in the shaft speed will produce an increase in forward inclination of the rotor plane.

3. An aircraft comprising a fuselage, a lifting rotor connected to said fuselage, said rotor being adjustable to vary the longitudinal attitude of the rotor plane with respect to the fuselage, a shaft connected to said rotor, rotor longitudinal attitude adjusting means connected to said rotor, automatic actuating means for said rotor longitudinal attitude adjusting means connected to and responsive to the speed of rotation of said shaft, manual actuating means for said rotor longitudinal attitude adjusting means, a differential mechanism having two inputs and one output, one of said inputs being connected to said automatic actuating means, the other of said inputs being connected to said manual actuating means, said output being connected to said rotor longitudinal attitude adjusting means, whereby when said manual actuating means is held fixed a decrease in shaft speed will produce a decrease in forward inclination of the rotor plane, and whereby an increase in shaft speed will produce an increase in forward inclination of the rotor plane.

4. An aircraft comprising a fuselage, a lifting rotor connected to said fuselage, said rotor being adjustable to vary the longitudinal attitude of the rotor plane with respect to the fuselage, a shaft connected to said rotor, rotor longitudinal attitude adjusting means connected to said rotor, automatic actuating means for said rotor longitudinal attitude adjusting means connected to and responsive to the speed of rotation of said shaft, manual actuating means for said rotor longitudinal attitude adjusting means, a differential mechanism having two inputs and one output, one of said inputs being connected to said manual actuating means, the other of said inputs being connected to said automatic actuating means, said output being connected to said rotor longitudinal attitude adjusting means, and stop means disposed on opposite sides of a portion of said differential mechanism to limit the movement of said portion, said stop means being adjustable to vary the differential effect of said mechanism, whereby when said stop means are in a position to permit displacement of said portion and said manual actuating means is held fixed a decrease in shaft speed will produce a decrease in forward inclination of the rotor plane, and whereby an increase in shaft speed will produce an increase in forward inclination of the rotor plane.

References Cited in the file of this patent
UNITED STATES PATENTS

| Number | Name | Date |
|---|---|---|
| 2,421,364 | Cierva | May 27, 1947 |
| 2,425,651 | Stalker | Aug. 12, 1947 |